(12) United States Patent
Gehl et al.

(10) Patent No.: US 12,411,215 B1
(45) Date of Patent: Sep. 9, 2025

(54) SYSTEM AND METHOD OF OPTICAL SCANNING WITH DETECTION OF RETURN SIGNALS USING A STAR COUPLER

(71) Applicant: National Technology & Engineering Solutions of Sandia, LLC, Albuquerque, NM (US)

(72) Inventors: Michael Gehl, Albuquerque, NM (US); Christopher Michael Long, Albuquerque, NM (US); Christopher Todd DeRose, Albuquerque, NM (US); Paul Davids, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 1205 days.

(21) Appl. No.: 17/210,852

(22) Filed: Mar. 24, 2021

Related U.S. Application Data (60) Provisional application No. 63/003,951, filed on Apr. 2, 2020.

(51) Int. Cl.
  *G01S 7/481* (2006.01)
  *G01S 17/89* (2020.01)
  *G02B 6/12* (2006.01)
  *G02B 6/125* (2006.01)
  *G02B 6/28* (2006.01)
  (Continued)

(52) U.S. Cl.
  CPC .......... *G01S 7/4817* (2013.01); *G01S 7/4818* (2013.01); *G01S 17/89* (2013.01); *G02B 6/12009* (2013.01); *G02B 6/125* (2013.01); *G02B 6/2813* (2013.01); *G02B 6/305* (2013.01); *G02F 1/292* (2013.01); *G02F 1/2955* (2013.01); *G02B 27/0087* (2013.01); *G02F 2203/24* (2013.01)

(58) Field of Classification Search
  CPC ...... G01S 7/4817; G01S 7/4818; G01S 17/89; G02B 6/125; G02B 6/2813; G02B 6/305
  See application file for complete search history.

(56) References Cited

U.S. PATENT DOCUMENTS

2009/0169148 A1\* 7/2009 Doerr ................. H04B 10/5053
                                                                 385/2
2019/0353977 A1\* 11/2019 Hung .................... G01S 17/931

OTHER PUBLICATIONS

Pinna et al. "Integrated Star Coupler-based Multi-Beam LiDAR" (Year: 2017).\*

(Continued)

*Primary Examiner* — Michelle R Connelly
*Assistant Examiner* — Eric Paul Struth
(74) *Attorney, Agent, or Firm* — Martin I. Finston; Mark A. Dodd (57) ABSTRACT

A LIDAR system or the like uses a star coupler to distribute an input light beam over a steerable array. The input light beam is injected through an input signal waveguide on the input side of the star coupler. The light returning after reflecting from external objects is directed back through the star coupler to one or more waveguides on the input side. Return light is detected in one or more waveguides on the input side that are displaced from the input signal waveguide. In embodiments, the beam direction of the steerable array changes during the round-trip transit time of the returning light. This causes the returning light to arrive off-axis, which in turn causes it to couple into one or more of the displaced input-side waveguides instead of coupling back into the input signal waveguide.

10 Claims, 12 Drawing Sheets

(51) Int. Cl.
  G02B 6/30       (2006.01)
  G02B 27/00      (2006.01)
  G02F 1/29       (2006.01)
  G02F 1/295      (2006.01)

(56) References Cited

OTHER PUBLICATIONS

Derose, C.T. et al., "Electronically controlled optical beam-steering by an active phased array of metallic hanoantennas", Optics Express, 2013. vol. 21, pp. 5198-5208.
Pinna, S. et al., "Integrated Star Coupler-based Multi-Beam LiDAR," 2017 IEEE Avionics and Vehicle Fiber-Optics and Photonics Conference (AVFOP), IEEE,2017, DOI: 10.1109/AVFOP.2017.8169781.
Dragone, C. "Efficient N × N Star Couplers Using Fourier Optics," IEEE Journal of Lightwave Technology, 1989, vol. 7, pp. 479-489.
Stanton, E.J. Stanton et al., "Star coupler for high-etendue LIDAR," in Conference on Lasers and Electro-Optics (CLEO 2017), OSA Technical Digest (online), Optical Society of America (2017), paper STh1M.4.

* cited by examiner

SYSTEM AND METHOD OF OPTICAL SCANNING WITH DETECTION OF RETURN SIGNALS USING A STAR COUPLER

CROSS-REFERENCE TO RELATED APPLICATION

This application claims the benefit of U.S. Provisional Application No. 63/003,951, filed Apr. 2, 2020, the entirety of which is hereby incorporated herein by reference.

STATEMENT OF GOVERNMENT RIGHTS

This invention was made with United States Government support under Contract No. DE-NA0003525 between National Technology & Engineering Solutions of Sandia, LLC and the United States Department of Energy/National Nuclear Security Administration. The United States Government has certain rights in this invention.

TECHNICAL FIELD

This invention relates to methods and apparatus of optical beam steering, and more particularly to beam steering using phased arrays.

ART BACKGROUND

Light detection and ranging (LIDAR) applications stand to gain significant reductions in size, weight, cost and power by moving from mechanical beam steering to solid state integrated solutions. A primary technique for achieving integrated beam steering is the use of a phased array of optical emitters. In this technique, an incoming optical signal is split into multiple paths. Each path undergoes a different delay or phase shift. Each path is then directed to an individual emitting element. The electromagnetic waves scattered respectively by each of these emitting elements interfere with each other. The collective interference creates a directed beam. By adjusting the relative delay or phase between elements, the angle of this directed beam can be controlled.

In a typical beam-steering LIDAR system, the beam is directed in a specific direction, an optical signal is emitted, and then the system continues to point in the same direction in order to collect return light that has been reflected from distant objects. After collecting return light for some period of time, the beam is then directed at a new angle and the process is repeated.

Because the speed of light is finite, this process is constrained by a fundamental relationship between the distances to detectable objects and the speed with which the beam can sweep across a desired area of detection. That is, if the system must detect very distant objects, it must stare in the same direction for a longer period of time, i.e., a time sufficient for the light reflected from those distant objects to return to the detection system.

One approach for overcoming this problem is offered by Sergio Pinna et al., "Integrated Star Coupler-based Multi-Beam LiDAR," 2017 IEEE Avionics and Vehicle Fiber-Optics and Photonics Conference (AVFOP), New Orleans, 7-9 Nov. 2017, IEEE (2017), DOI: 10.1109/AVFOP.2017.8169781, cited below as Pinna (2017), and hereby incorporated by reference herein in entirety.

In Pinna (2017), the investigators reported an architecture for a LIDAR receiver that could reduce scan times by flash-illuminating a broad field of view and collecting the return light simultaneously and independently from multiple directions of arrival. The consequent ability to simultaneously detect and track multiple targets could potentially increase the scan rate, but the scan rate would still be limited by the finite speed of light.

If this fundamental constraint could be overcome, the door would be opened to even faster scan rates and other enhancements in the performance of LIDAR systems.

SUMMARY OF THE INVENTION

We have devised an alternate method of collecting the returning light that overcomes the fundamental constraint described above. Our new approach takes advantage of the optical properties of an integrated optical splitter of the type based on a star coupler. A star coupler is an arrayed waveguide grating (AWG) device in which an input array of waveguides is separated from an output array of waveguides by a slab waveguide region. The waveguides and slab waveguide region are arranged so that the optical power incident on any input waveguide will couple to the output array in such a manner that it is distributed over all of the waveguides in the output array.

For beam steering, the input beam, or send signal, is injected onto the center waveguide of the input array. The resulting output beams are taken from the respective waveguides of the output array, subjected to individual, controllable phase shifts, and then directed to respective antenna elements for transmission. By "antenna element" we mean any element capable of emission or reception of infrared radiation. The elements used for transmission are typically different in design from those used for reception. However, embodiments of the ideas presented here advantageously transmit and receive using antenna elements that are suitable for both functions.

Return light that reenters the beam-steering system and traverses its original optical path in reverse will come to a focus on the end of the center input waveguide, and it will couple back into the center input waveguide, if the light is returning from the direction in which the beam is currently aimed. Otherwise, the return light may instead couple into a different waveguide of the input array.

We have realized that if the return signal couples into a different waveguide from the waveguide into which the original send signal was injected, then the return signal can be directly processed without additional optical elements to separate it from the send signal.

Accordingly, the invention in one aspect relates to an optical scanning method for LIDAR or the like, in which a controllable phase shift is distributed across an array of output waveguides and used to steer a send beam of light. A star coupler is used to distribute the input light for the send beam across the array of output waveguides. A return beam of light is detected after reflecting from external objects. The method includes operations of injecting the input beam of light into an input signal waveguide, sweeping the send beam of light, and detecting light from the return beam.

The input beam is injected into an input signal waveguide on an input side of the star coupler, wherein the input signal waveguide is part of an input waveguide array comprising the input signal waveguide and one or more additional input-side waveguides. The send beam of light is swept by controlling the controllable phase shift. The detected light is light from the return beam that has reentered the star coupler through the array of output waveguides and coupled into at least one of the additional input-side waveguides.

In embodiments, light from the return beam couples into additional input-side waveguides without additional optical beam-splitting elements.

In embodiments, light from the return beam is detected concurrently with the sweeping of the send beam of light.

In embodiments, the same antenna elements are effective both for transmitting the send beam of light and for receiving the return beam of light.

In embodiments, return light is detected in an additional input-side waveguide on one side of the input signal waveguide while the beam is swept in one direction, and detected from an additional input-side waveguide on the other side of the input signal waveguide while the beam is swept in the opposite direction.

In embodiments, portions of the return light that are returning with different round-trip delays are detected in different additional input-side waveguides.

The invention in a second aspect relates to an apparatus for optical scanning, comprising a star coupler and an array of optical antenna elements. In the star coupler, an input waveguide array comprises an input signal waveguide and one or more additional input-side waveguides, and an output waveguide array comprises a plurality of output waveguides. The optical antenna elements are adapted both for transmitting send signals and for receiving return signals. Each antenna element is optically coupled to a respective output waveguide. A steerable send beam of transmitted light is defined by controllable phase shifter that adjust phase shifts in respective output waveguides.

The input signal waveguide is adapted to receive an input beam of light from a light source in order for the star coupler to distribute it into the array of output waveguides. A respective optical detector is optically coupled to each of the one or more additional input-side waveguides for detecting light from return signals that has reentered the star coupler through the output waveguides.

BRIEF DESCRIPTION OF THE DRAWINGS

In FIG. 14, the returning light is coupled back into the center input waveguide.

In FIG. 15, the focused spot of returning light has shifted enough that the returning light is coupled into a waveguide two positions over from the center input waveguide.

DETAILED DESCRIPTION

Our device is based on a planar waveguide star coupler. Optical couplers of that kind have been known for many years. The technology for designing, making, and using them is described, for example, in C. Dragone, "Efficient N×N Star Couplers Using Fourier Optics," *J. Lightwave Technol.*, vol. 7, no. 3, IEEE (March 1989) 479-489, and in E. J. Stanton et al., "Star coupler for high-etendue LIDAR," in *Conference on Lasers and Electro-Optics* (CLEO 2017), OSA Technical Digest (online), Optical Society of America (2017), paper STh1M.4, the entirety of each of which is hereby incorporated herein by reference.

In a star coupler, an arcuate array of input waveguides communicates with an arcuate array of output waveguides across a slab waveguide section, which serves as a so-called "free space" region for optical propagation. Due to the transverse expansion of the optical signal in the free space region, an optical signal injected into any input port is distributed over all output ports, and vice versa.

In LIDAR applications, return signals re-enter the output array and follow a reverse propagation path across the free-space region. If the direction of a return signal is on the instantaneous beam axis, then within the free-space region, the returning light beams from the respective output waveguides will interfere in such a way that the majority of the light will be focused to a point at the end of the center input waveguide.

Pinna (2017), cited above, describes a similar arrangement in a LIDAR detector array that is physically separate from the light source. The input waveguides receive the return signal, which is collected in output waveguides after crossing the free-space region. The Pinna device can simultaneously detect targets at multiple angles because, again due to interference effects in the free-space region, return light coming from different directions will be directed to different output waveguides.

The Pinna system operates differently from the system that we will describe below. The Pinna transmitter is realized with a broad beam grating that illuminates the total field of view, as in flash LIDAR sensors. Flash LIDAR illuminates the field of view with a train of pulses that can be individually detected, and their round-trip transit times individually measured. In the Pinna system, targets situated at different angles within a static field of view can be simultaneously detected.

Because the Pinna detector is physically separate from the light source, there is no need to separate counterpropagating optical signals that share the same propagation medium.

By contrast, the star coupler in our system is shared by the light source and by the photodetectors. This necessarily means that both the send light and the return light pass through the same output waveguides and the same free-space region. In a static exposure aimed at a reflective target, the send and return light would also pass through the same input waveguide, i.e., through the central waveguide of the input array.

Conventional systems address this last problem by using bulky optical components such as beam splitters and optical circulators to divert the return light toward the photodetectors and away from the light source.

In our system, however, the field of view is not static. Instead, the return light is detected while the LIDAR beam is dynamically sweeping, so that the beam axis changes during the round-trip delay between the transmission of an outgoing send signal and the detection of its incoming reflection. The resulting angular displacement between the beam axis and the incoming direction of the return light increases with the round-trip delay of the return light. As in the Pinna detector, the angular displacement causes the incoming light to be collected in waveguides that are displaced from the central waveguide of the array used for collection.

But unlike the Pinna device, our device integrates transmission and reception on the same platform, it can transmit and receive concurrently, it uses a narrowly directed beam for illumination, it can sweep the beam continuously, and it can be used with either pulsed or continuous-wave illumination.

Figure 1:
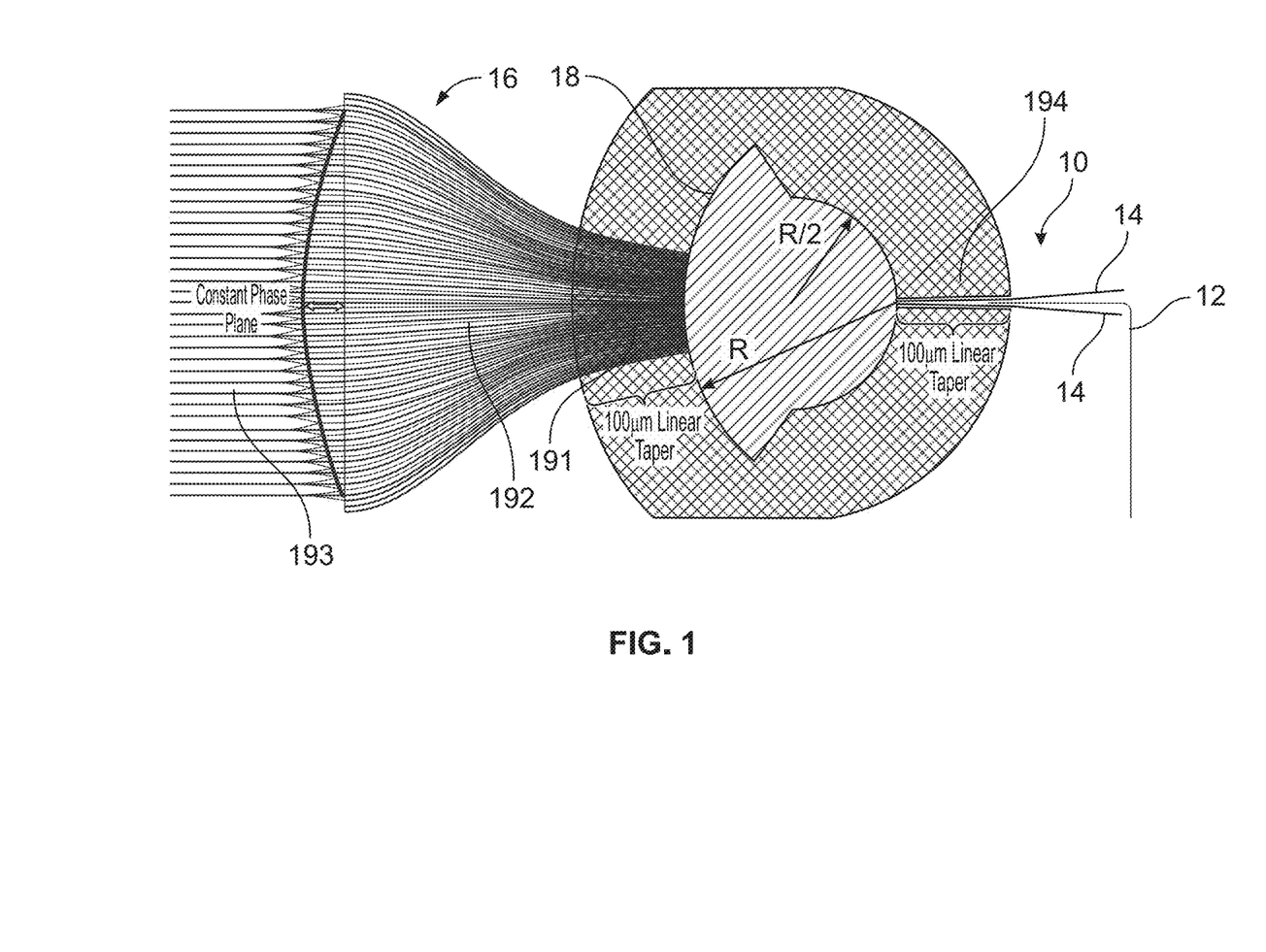
FIG. 1 is a scale drawing of an example star coupler useful for practicing the invention. In the figure, the star coupler is seen in cross-section.

Our device will now be described in greater detail with reference to the accompanying figures. FIG. 1 is a view of our star coupler in an example implementation, as seen in cross-section. On the right-hand side (as seen in the view of FIG. 1), an array 10 of input waveguides are arranged on an arc of radius R/2. The figure shows the central input waveguide 12 and one waveguide 14 on each side of the central waveguide. Any desired number of further waveguides could be added to the array.

On the left-hand side, an array 16 of output waveguides are arranged, opposite to the input waveguides, on an arc of radius R. In between the two waveguide arrays is a slab waveguide section 18, i.e., the "free space region," in which light is able to expand in the transverse direction.

An illustrative example uses a star coupler fabricated in silicon, although alternative materials may be used, such as silicon nitride. It is possible to design for any of various operating wavelengths. Our design studies, by way of example but not limitation, have been directed to an operating wavelength of 1.55 µm. An example value for R in our design studies is 185 µm, although other values may also be suitable. For example, we have evaluated designs with values of R as high as 1100 µm.

With further reference to FIG. 1, it will be seen that the array 16 of output waveguides has a linear taper region 191 that transitions to an S-bend region 192, and then to a parallel array 193. The linear taper region is 100 µm long in the present example. In the present example, the waveguide width in the linear taper region is tapered from a maximum of 2 µm at the arc of radius R to a minimum of 0.6 µm at the beginning of the S-bend region. As those skilled in the art will recognize, a width of 0.6 µm is characteristic of single-mode waveguides.

As the waveguide width decreases, the separation between adjacent waveguides increases. This is desirable for suppressing the coupling of modes between adjacent waveguides. Within the S-bend region, the waveguide width is constant.

In the present example, the shape of the S-bend corresponds to a spline curve. The length of the S-bend is adjusted to drive the minimum radius of curvature within the S-bend high enough to avoid unacceptable optical loss. A typical value in the present example is about 80 µm.

It is acceptable for all of the waveguides to be partially etched waveguides. However, in some examples, the waveguides in the parallel array 193 can transition from a partially etched conformation to a fully etched conformation.

Array 10 of input waveguides includes a 100-µm linear taper region 194 in the present example. The waveguides in this region taper from a fully etched, 400-nm-wide conformation at the right side (as seen in the view of the figure) to a partially etched, 2-µm-wide conformation at the left side. In other examples, however, both sides of the taper may be partially etched.

For the purposes of phased array beam steering, light which is being emitted from the system (referred to as the send signal) enters the star coupler through the center input waveguide seen on the left-hand side of the figure, where it is marked as the "Send Signal Waveguide." The light expands in the transverse direction as it propagates (to the left, in the figure) across the slab region. Upon reaching the opposite side of the slab region, the light couples into the array of output waveguides. The amount of light which couples into each waveguide is dependent on the specific value of R, and on the width and positioning of the input and output waveguides.

Once the light has been split by the star coupler, each waveguide is sent to a separate time delay or phase shift determined by the requirements for beam steering, and then on to an emitting element for transmission. Suitable phase shifters and emitting elements are well known in the art and need not be described here in detail. Example emitting elements are discussed below. The phase shifters and emitting elements are not shown in the figure.

Light reflected from external objects can then return and be collected by, e.g., the same array of emitting elements.

This return signal will then pass back through the same delay or phase shift elements and back into the star coupler from the opposite direction (i.e., from the left according to the figure).

If the return signal enters the system on the same axis as the current send signal (as determined by the delay or phase shift elements), then upon entering the slab region of the star coupler, the light from each of the waveguides will interfere in such a way that the majority of the light will be focused to a point at the end of the center input waveguide.

Figure 2:
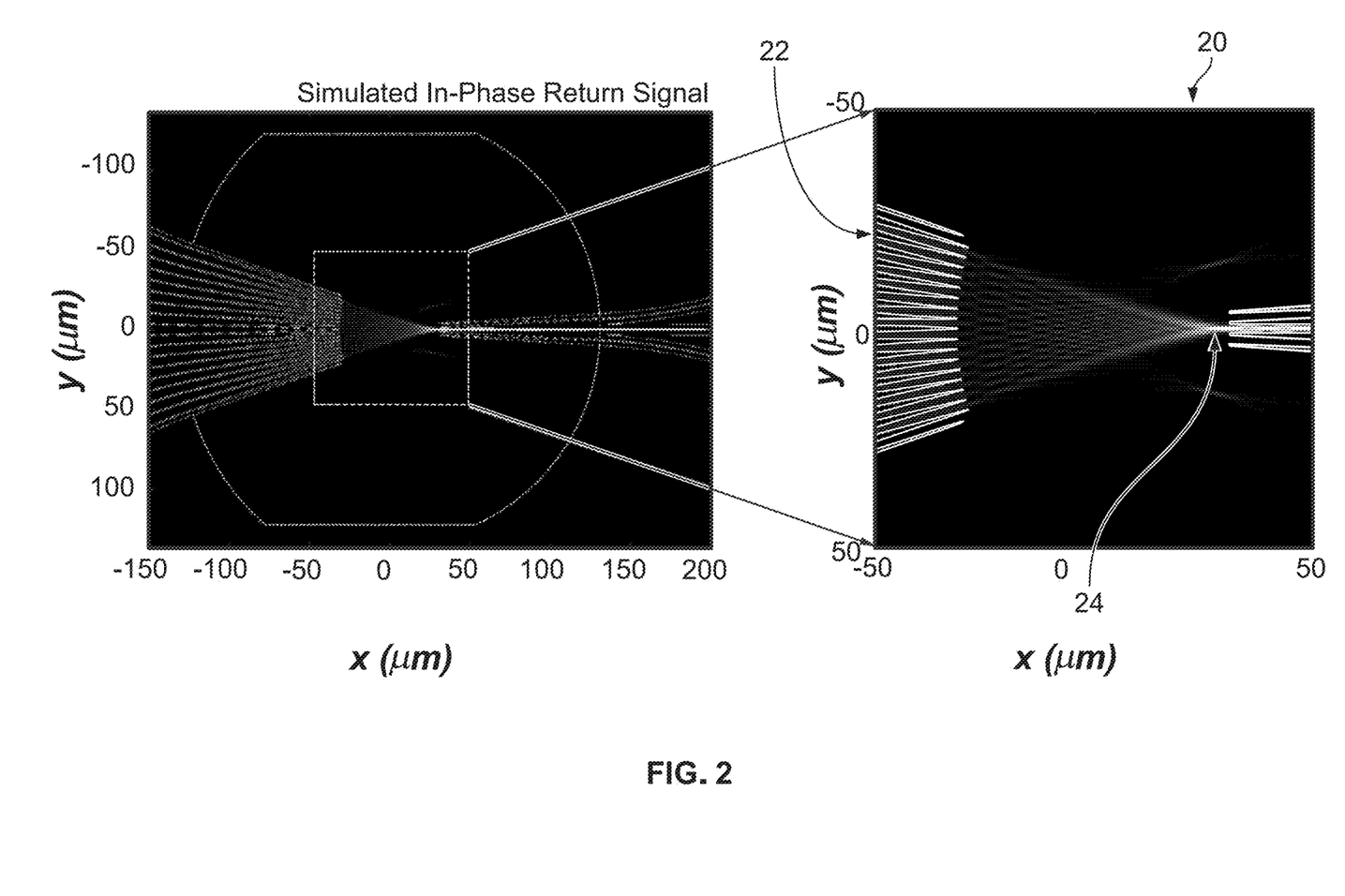
FIG. 2 is a computer-generated image, produced by numerical simulation, of the return signal in a star coupler when the return signal is arriving on-axis.

This behavior is illustrated, for example, in FIG. 2. FIG. 2 is a computer-generated image, produced by numerical simulation, of the return signal in a star coupler when the return signal is arriving on-axis. As seen most clearly in the magnified inset 20, the incoming beamlets of return light from the waveguides 22 of the output waveguide array combine as they reach the input waveguide array 24 such that they are in-phase where they enter the center input waveguide 24.

But because the center input waveguide is also being used for the send signal, additional optical elements would conventionally be needed in order to separate this return light from the send light. The separation could be effectuated, for example, by a 1×2 or 2×2 splitter. However, that would introduce a 50% loss to the send signal and another 50% loss to the return signal, resulting in a fourfold reduction in signal strength. Alternatively, the separation could be effectuated by an optical circulator, although current technological capabilities do not provide a suitable optical circulator that can be fabricated as an integrated component. Instead, a discrete component would be needed, thereby increasing the size and weight of the system.

The use of a star coupler as the splitting element of the phased array system allows for a different option. Light that returns to the system from an angle that is off-axis will have an additional linear phase shift across each of the antenna elements (i.e., the emitting and receiving elements) relative to the send signal. This is illustrated notionally in FIG. 3.

Figure 3:
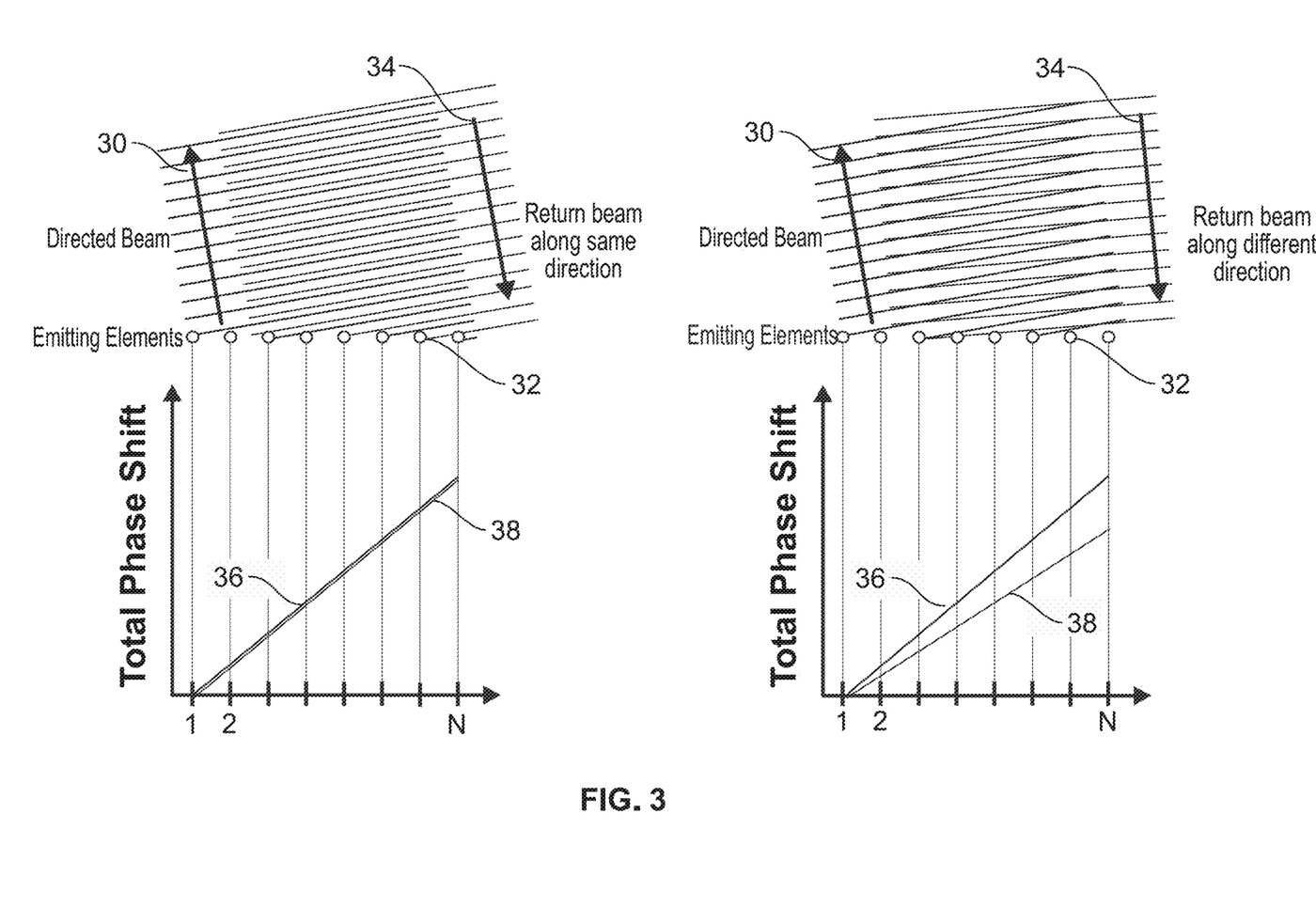
FIG. 3 consists of two notional sketches relating the linear phase shift across an antenna array to the transmitted and returning wavefronts when the returning beam is respectively on-axis (left-hand sketch) and off-axis (right-hand sketch).
Figure 4:
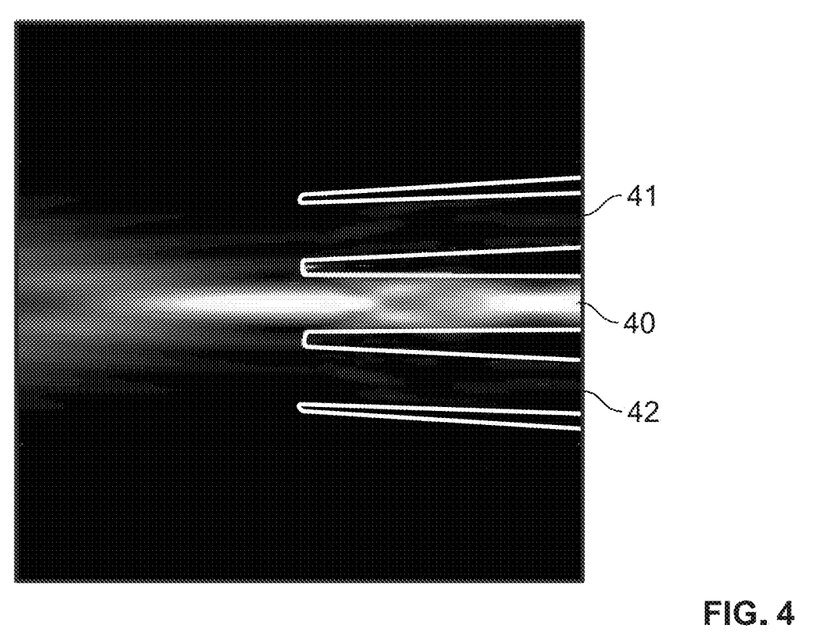
FIGS. 4-13 are a sequence of computer-generated images of the return signal in a star coupler, as produced by numerical simulation. The intensity distribution of the optical beam within the star coupler is represented in the images. Over the sequence of images, the linear phase shift across the output waveguides of the star coupler is gradually increasing.
Figure 5:
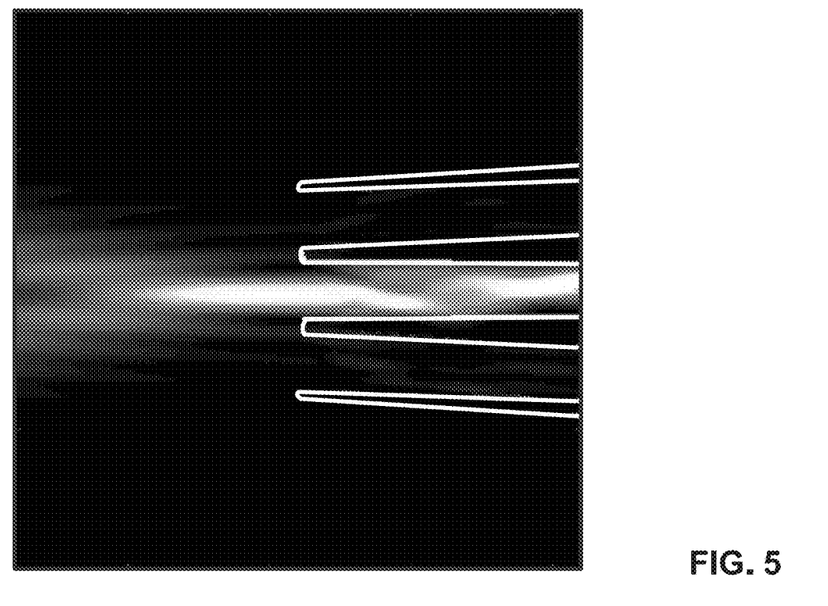
Figure 6:
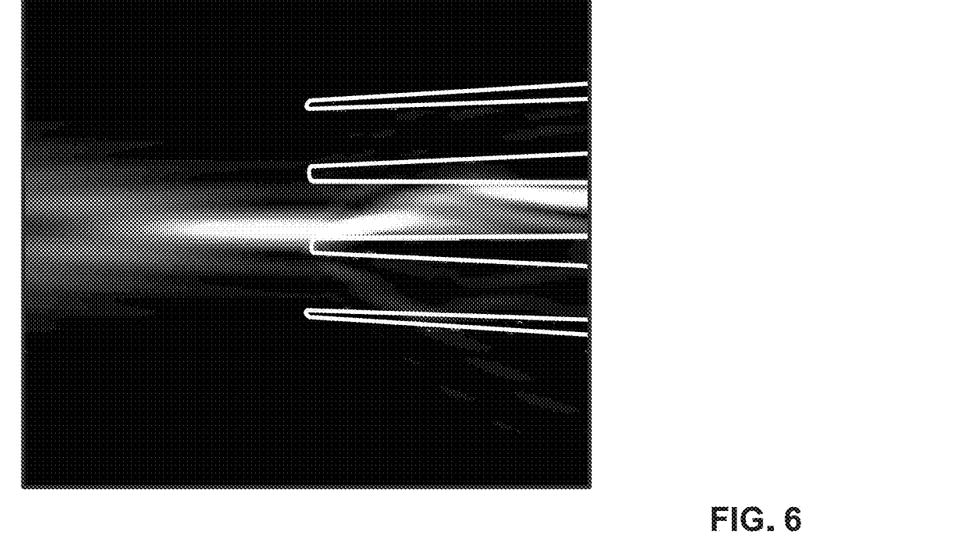
Figure 7:
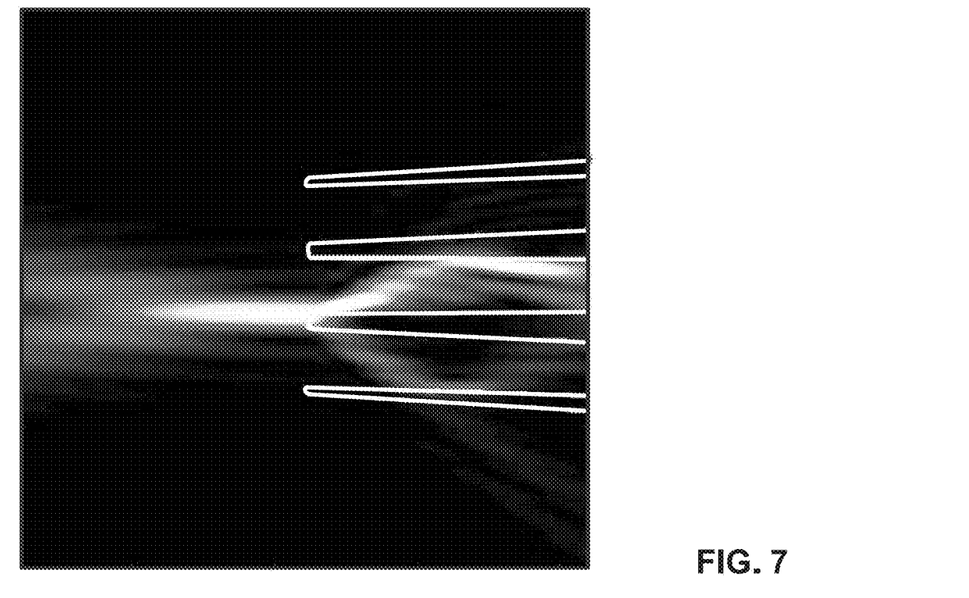
Figure 8:
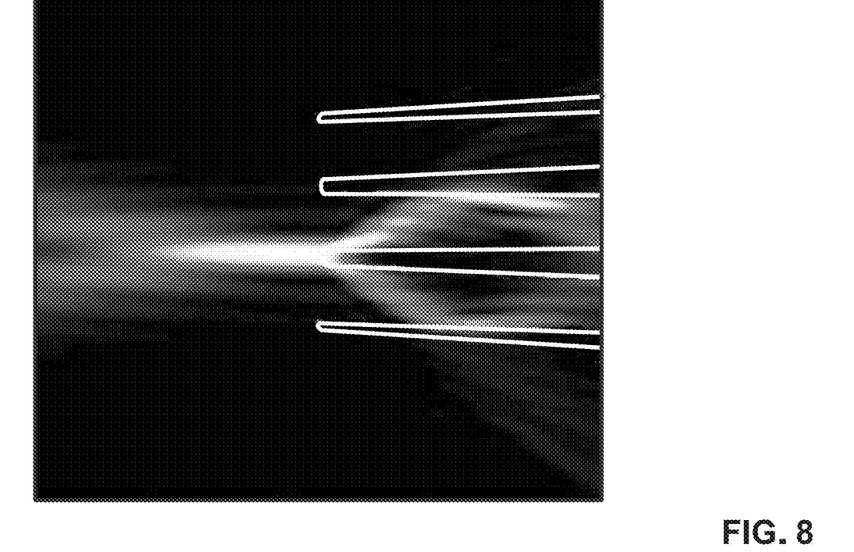
Figure 9:
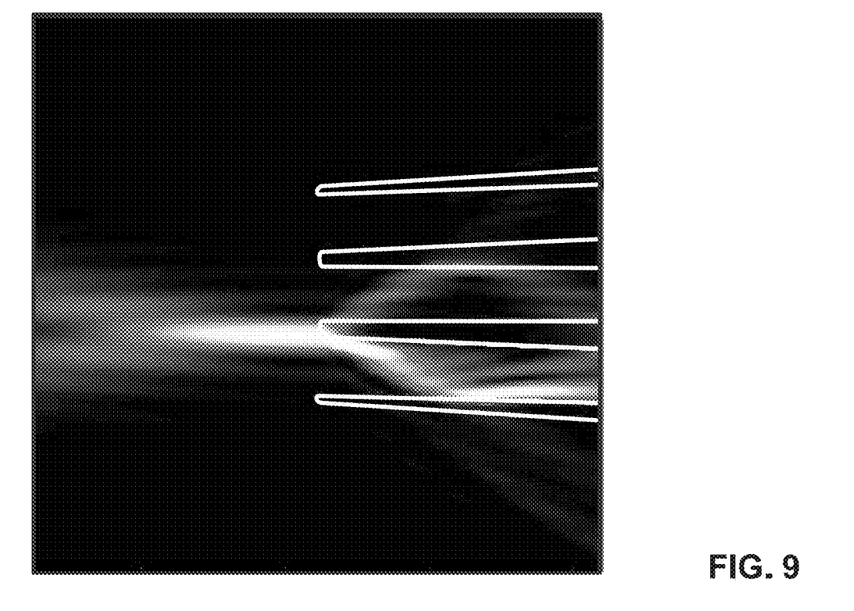
Figure 10:
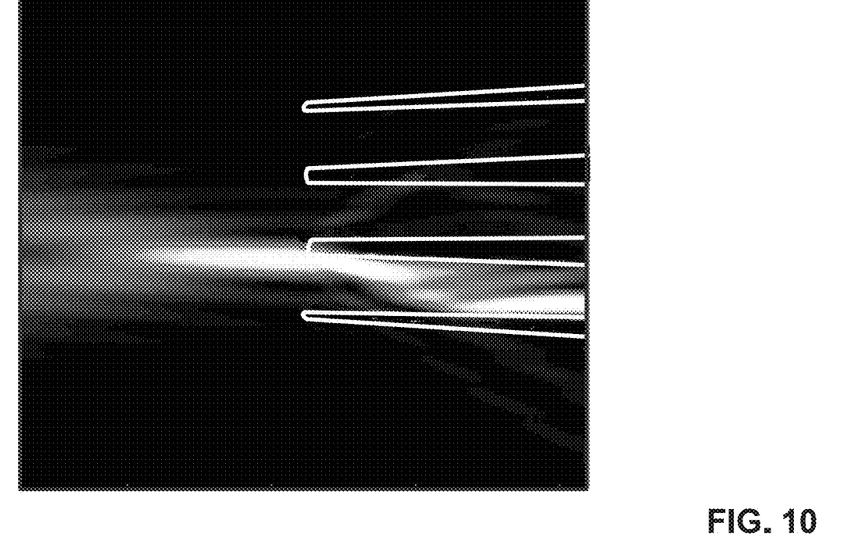
Figure 11:
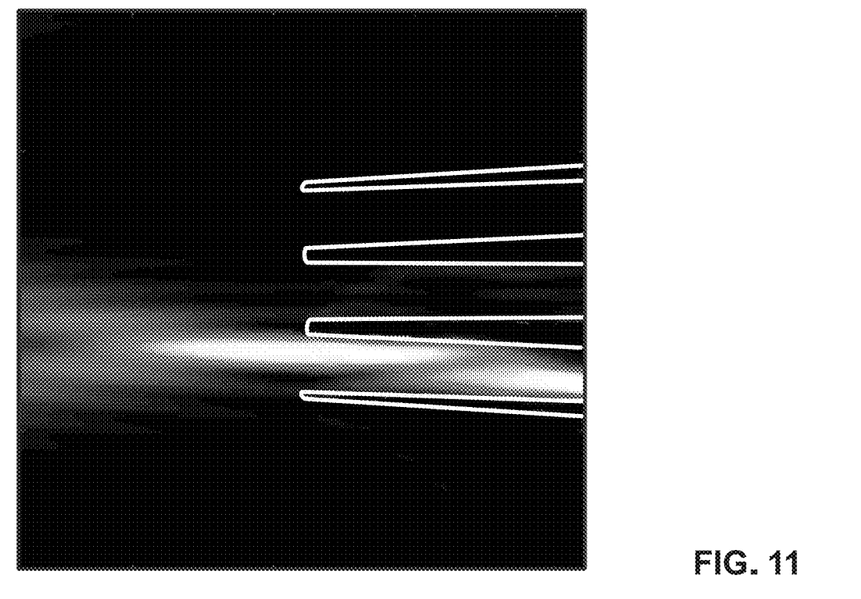
Figure 12:
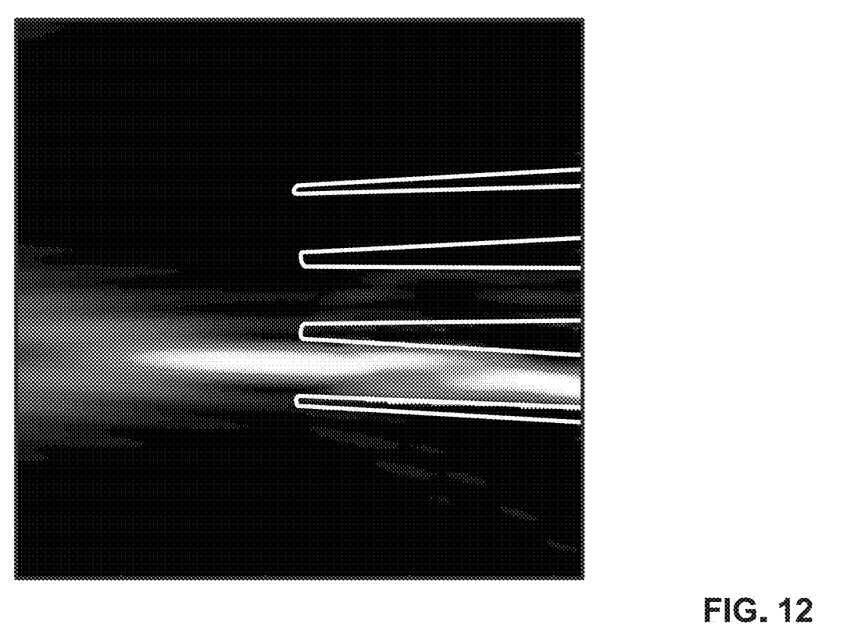
Figure 13:
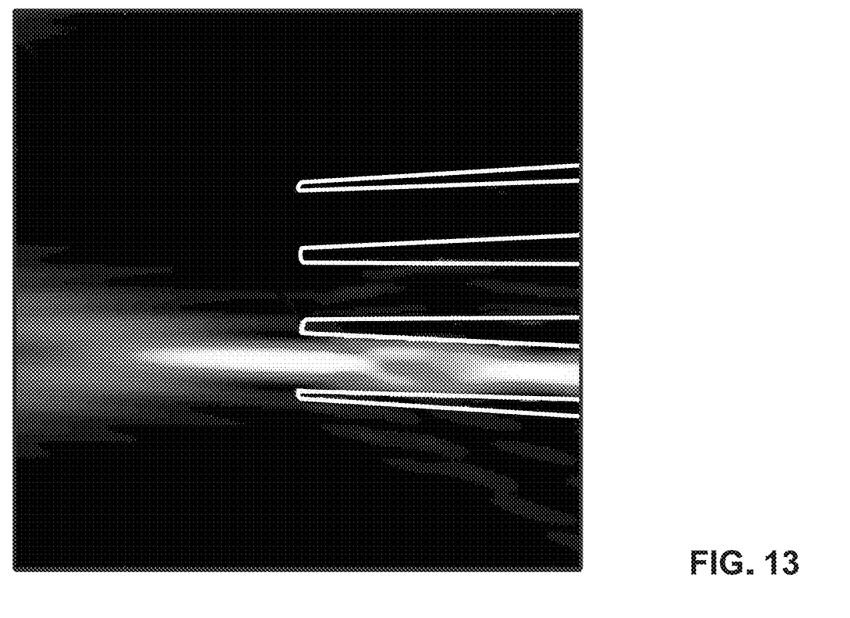

On the left-hand side of FIG. 3 is an example in which light returns on-axis, i.e., along the same angle as the pointing angle of the antennas. The directed beam shown by an arrow 30 in the outgoing direction has some linear phase shift across the emitting elements 32, which is set by the phase shifting elements of the system. The return light, shown by an arrow 34 in the incoming direction, has this same linear phase shift across the elements. The linear phase shift is removed as the light passes back through the phase shifters, provided the phase shifter setting has not changed in the time that it took for the light to reflect from a distant object and return to the system.

In the case illustrated by the left-hand side of FIG. 3, the light returning to the star coupler has no relative phase shift across the waveguides, and the light therefore focuses to the center input waveguide as shown in FIG. 2. This is illustrated in the figure by the coincidence of curves 36 and 38, which represent the variation in total phase shift across the emitting elements for the directed outgoing beam and the return light, respectively.

By contrast, the right-hand side of FIG. 3 illustrates the case in which the settings of the phase shifters have changed during the time interval after emission but before the emitted light has reflected from external objects and returned to the system. Now, there is a relative angle between the directed send signal and the return signal.

This relative angle can also be thought of as a difference in the linear phase across the elements, i.e., a difference between the linear phase at emission and the linear phase at detection. As a result, when the return signal passes back through the phase shifters, its linear phase is not entirely canceled out. When the light reaches the star coupler, there is a residual linear phase across the waveguides. Consequently, as the light interferes inside of the slab region of the star coupler, it now focuses to a point that is offset from the center.

This is illustrated in FIGS. 4-13, which show a sequence of images of the intensity distribution of the optical beam within the star coupler, as generated from a computer simulation.

Each of the images is a detail of the returning beam of light as it leaves the free-space region of the star coupler and enters the input waveguide array. The portion of the input waveguide array that is shown consists of the center input waveguide 40 and one additional waveguide 41, 42 on each side of the center input waveguide. The specific numbers and locations of additional waveguides for collection of the return signal can be adapted as desired to accommodate different system designs, beam-sweep patterns, and processing algorithms.

Over the sequence of images, there is a gradual increase in the linear phase across the waveguides. As the figures show, this results in a gradual shift of the focused spot.

Once the linear phase has reached a certain magnitude, the spot will be shifted enough that it no longer couples to the input waveguide, but instead couples to a waveguide off to the side of the input waveguide. In that case, the send signal and return signal will be propagating on separate waveguides. Therefore, the return signal can be directly processed without additional optical elements to separate it from the send signal.

In use, the system is initially directed in a specific angle and light is sent out. The angle of the output beam is then swept in one direction. Meanwhile, the initial send signal is propagating outwards and reflecting off of distant objects. When the reflection returns to the system, it has a different relative angle to that of the current send signal. It therefore focuses to one of the waveguides to the side of the input waveguide, as seen in FIGS. 4-13.

If the direction of the beam sweep is reversed, the returning light will instead focus to the waveguide on the opposite side of the input waveguide. Therefore, one would in this case monitor the return signal from both of these waveguides, with the return signal alternating between the two as the direction of the sweep changes.

As noted above, further waveguides can be added to the input waveguide array at greater offsets from the center input waveguide. Waveguides at greater offset will collect light that returns with a greater relative angle.

Figure 14:
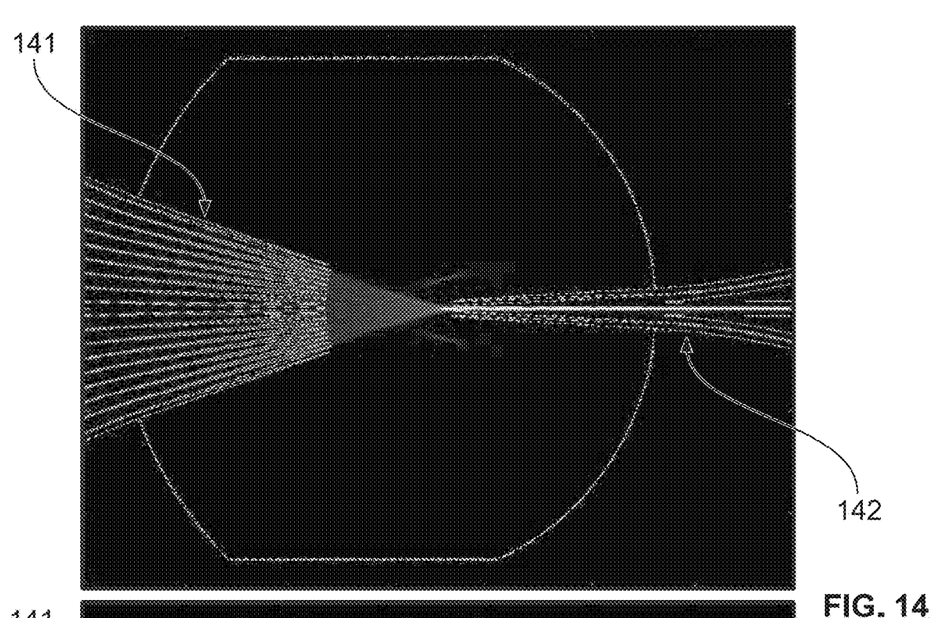
FIGS. 14 and 15 are computer-generated images similar to FIGS. 4-13, but at a lower magnification so that both the output waveguide array and the input waveguide array are visible.
Figure 15:
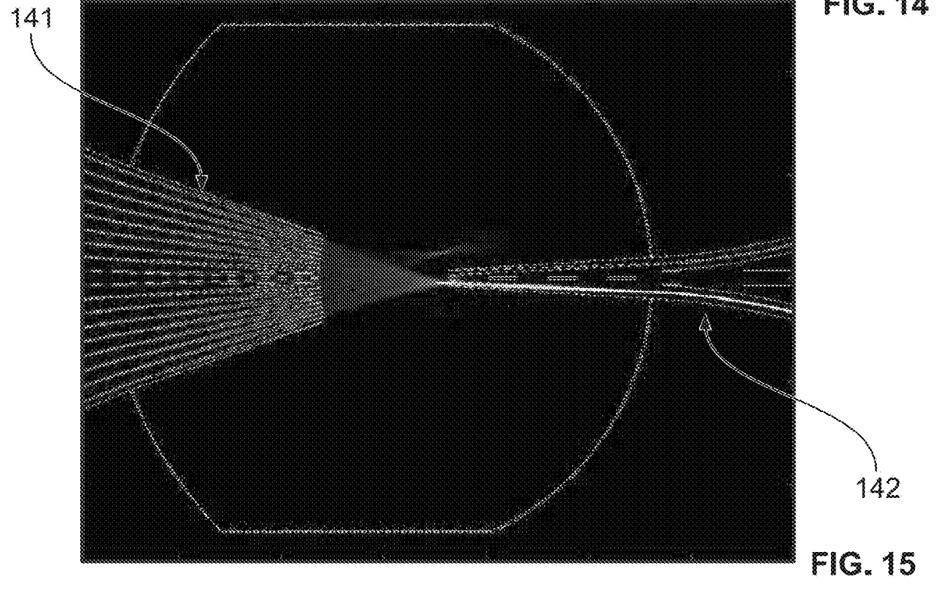

FIGS. 14 and 15 are computer-generated images similar to FIGS. 4-13, but at a lower magnification so that both the output waveguide array 141 and the input waveguide array 142 are visible. In FIG. 14, the returning light is coupled back into the center input waveguide. In FIG. 15, the focused spot of returning light has shifted enough that the returning light is coupled into a waveguide two positions over from the center input waveguide.

It is noteworthy that if light in the send signal is reflecting from external objects distributed over a range of distances from the system, the reflections will return to the system after a range of round-trip time delays. If the send-signal beam is sweeping continuously during this range of transit times, then the relative angle between the send signal and the return signal will vary according to the distance of the reflecting object, so that the largest relative angles will correspond to the most distant reflecting objects.

Figure 16:
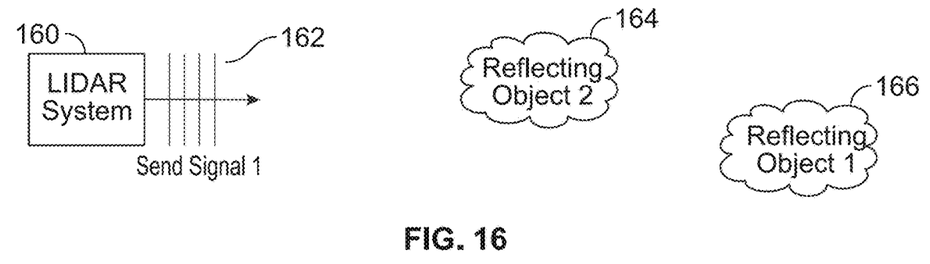
FIGS. 16-18 are cartoon drawings illustrating how a scanning arrangement can be used to discriminate objects that are reflecting from different distance ranges.

An arrangement of waveguides placed at different offsets can therefore be used to discriminate objects that are reflecting from different distance ranges. This is illustrated in the cartoon drawings of FIGS. 16 and 17. In the figures, beam-steering system 160 is shown scanning a field of view containing a reflecting object 164 that is closer to system 160 and a reflecting object 166 that is farther from system 160. The outgoing beam direction changes during the scan. This is represented in the figure by the angular displacement between send signal 162, which is transmitted at the beginning of the scan, and send signal 170, which is transmitted later in the scan.

Figure 17:
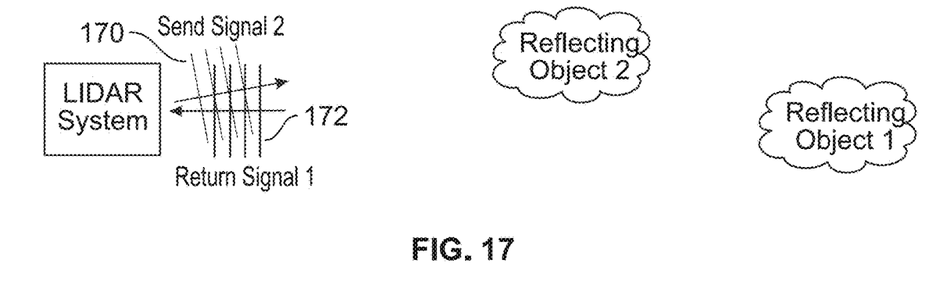

As shown in FIG. 17, the outgoing beam direction has advanced from the direction of send signal 162 to the direction of send signal 170 during the time it has taken for send signal 162 to reflect from object 166 and return to the system as return signal 172. This results in a relative angle between the return signal and the current direction of the send signal, as seen in the figure. This can result in the focusing of the returning light into a waveguide of the input waveguide array that is offset from the center input waveguide.

Figure 18:
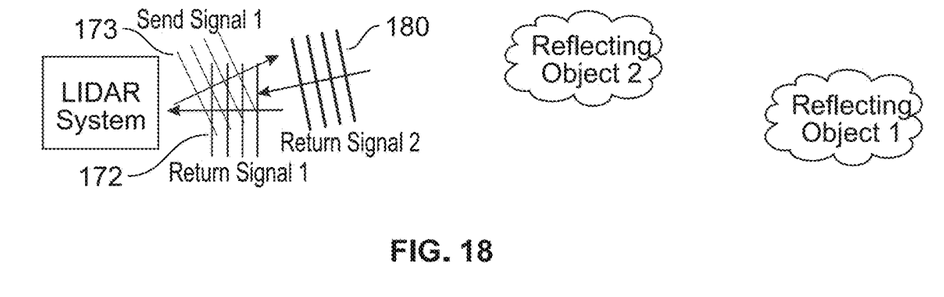

In FIG. 18, send signal 173 indicates the current direction of the scan. Return beam 172 was reflected from the more distant object 166, and therefore makes a larger angle with signal 173. Return beam 180 was reflected from the closer object 164, and therefore makes the smaller angle with signal 173. Accordingly, beam 172 may be focused into a waveguide farther from the center input waveguide, and beam 180 may be focused into a waveguide nearer the center input waveguide.

Figure 19:
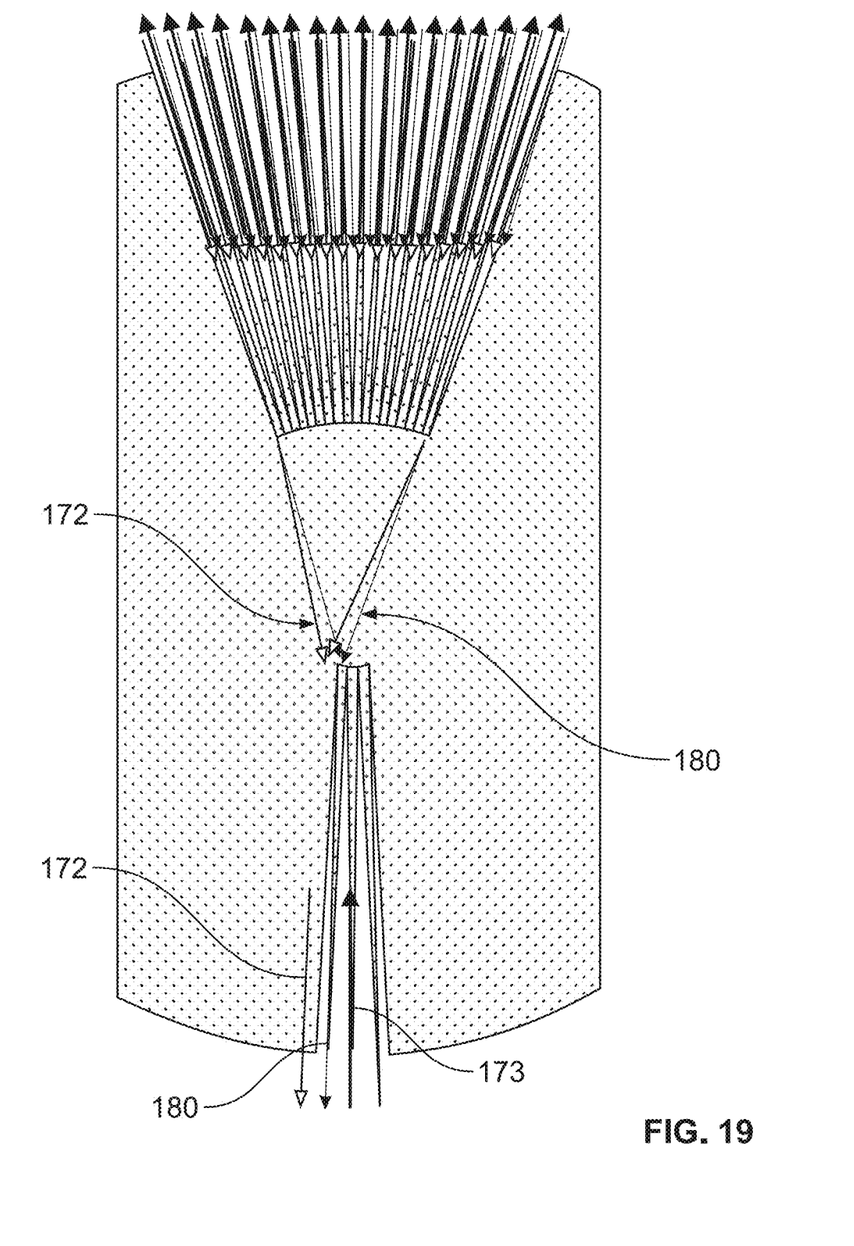
FIG. 19 is a schematic drawing of a beam-steering system, illustrating how reflections from objects at different distance ranges can be discriminated during a scan.

The example of FIG. 18 is illustrated further in FIG. 19. FIG. 19 is a schematic drawing of a beam-steering system such as the system of FIG. 18. The send beam 173 is shown in the figure. As also represented in the figure, two outgoing signals have reflected from objects in the field of view and have returned as return signals 172 and 180. Signal 180 was reflected from the closer object and is therefore the first reflection to be detected. Signal 172 was reflected from the more distant object and is therefore the second of the two reflections to be detected.

Return signal 180 has returned at a small angle relative to the outgoing beam direction. It is focused into the first waveguide next to the center input waveguide. Return signal 172, which is the later-returning reflection, returns with a greater relative angle. It is focused into the second waveguide from the center input waveguide.

Figure 20:
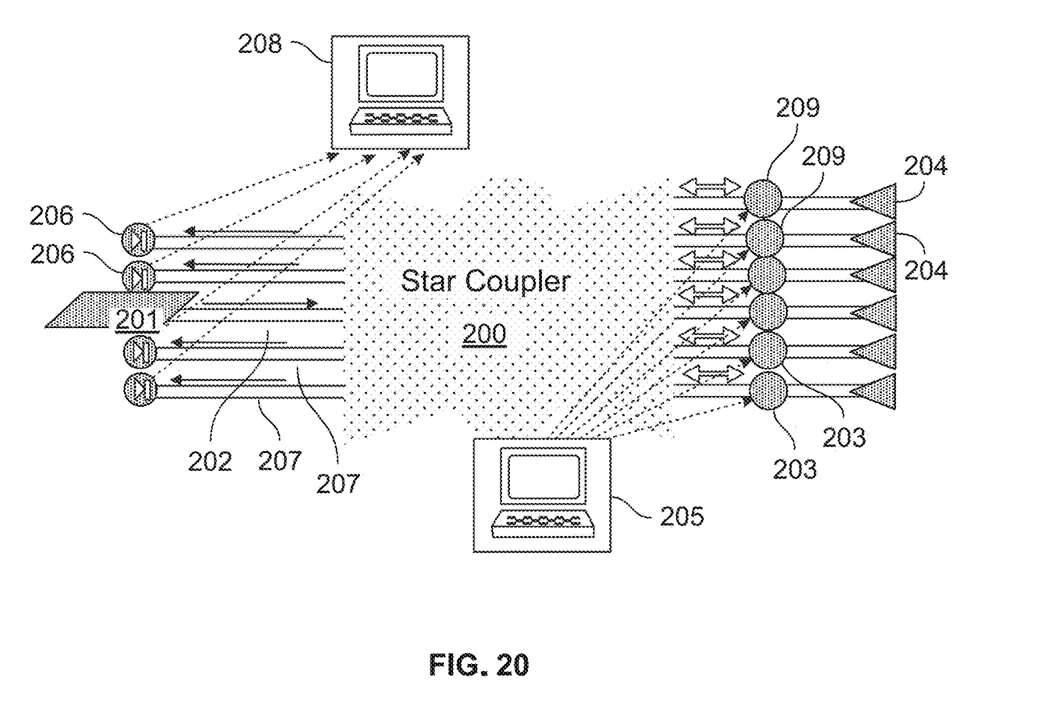
FIG. 20 is a block diagram depicting, in notional form, an example architecture for a system of the kind described here.

FIG. 20 is a block diagram depicting, in notional form, an example architecture for a system of the kind described here. The star coupler 200 is shown in the center of the figure. A light source 201 is shown coupled to the input signal waveguide 202. A phase shifter 203 is included in each of the output waveguides 209, and each output waveguide is shown coupled to an antenna element 204.

Suitable antenna elements are well-known in the art. Examples include dielectric gratings overlying the output waveguides, metal layers overlying the output waveguides and perforated by radiative holes, and modulations etched into the sides of the output waveguides. One example of an antenna element that may be useful in this regard is provided by C. T. DeRose et al., "Electronically controlled optical beam-steering by an active phased array of metallic nano-antennas," *Optics Express* 21 (2013) 5198-5208, the entirety of which is hereby incorporated herein by reference.

Turning back to FIG. 20, a controller 205 is provided to control the phase shifts in each of the output waveguides 209 and thereby to steer the beam of the antenna array. A photodetector 206 is coupled to each of the additional input-side waveguides 207 to detect return light. A processor 208 receives input from each of the photodetectors. The processor, which may be any suitable general-purpose or special-purpose digital device that processes information, provides output indicative of the return signals. In embodiments, the processor also derives range information from the positions in the array of those additional input-side waveguides that are actively receiving return signals.

We claim:

1. A method of optical scanning of the kind in which a controllable phase shift is distributed across an array of output waveguides and used to steer a send beam of light, in which a return beam of light is detected after reflecting from external objects, and in which a star coupler is used to distribute an input beam of light into the array of output waveguides, comprising:
    injecting the input beam of light into an input signal waveguide on an input side of the star coupler, wherein the input signal waveguide is part of an input waveguide array comprising the input signal waveguide and one or more additional input-side waveguides;
    sweeping the send beam of light by controlling the controllable phase shift; and
    detecting light from the return beam that has coupled into at least one of the additional input-side waveguides, wherein:
    the return beam reenters the star coupler through the array of output waveguides.

2. The method of claim 1, wherein the coupling of light from the return beam into at least one of the additional input-side waveguides is effectuated by the star coupler without additional optical beam-splitting elements.

3. The method of claim 2, wherein the detecting of light from the return beam is performed concurrently with the sweeping of the send beam of light.

4. The method of claim 1, wherein the send beam of light is transmitted by an array of antenna elements, and the return beam of light is received by the same array of antenna elements.

5. The method of claim 1, wherein:
    the input waveguide array comprises two additional input-side waveguides placed on opposite sides of the input signal waveguide;
    the sweeping of the send beam comprises sweeping in a first direction and sweeping in a second direction opposite to the first direction;
    the detecting of light from the return beam comprises detecting light from one of the additional input-side waveguides while the sweeping is in the first direction; and
    the detecting of light from the return beam further comprises detecting light from the other of the additional input-side waveguides while the sweeping is in the second direction.

6. The method of claim 1, wherein:
    the input waveguide array comprises two or more additional input-side waveguides; and
    the detecting of light from the return beam comprises detecting light from each of the two or more additional input-side waveguides while sweeping the send beam of light in one sweep direction.

7. Apparatus for optical scanning, comprising:
    a star coupler in which an input waveguide array comprises an input signal waveguide and one or more additional input-side waveguides, and in which an output waveguide array comprises a plurality of output waveguides; and
    an array of optical antenna elements adapted for transmitting send signals and receiving return signals, in which each optical antenna element is optically coupled to a respective output waveguide, wherein:
    a respective phase shifter is conformed to controllably adjust a phase shift in each of the output waveguides, whereby a steerable send beam of transmitted light can be defined;
    the input signal waveguide is adapted to receive an input beam of light from a light source in order for said input beam of light to be distributed by the star coupler into the array of output waveguides; and
    a respective optical detector is optically coupled to each of the one or more additional input-side waveguides for detecting light from return signals that has reentered the star coupler through the output waveguides.

8. The apparatus of claim 7, wherein each optical detector is optically coupled to a respective additional input-side waveguide without additional optical beam-splitting elements.

9. The apparatus of claim 7, conformed for sweeping the steerable send beam of transmitted light, and conformed to perform said sweeping while concurrently detecting light from return signals.

10. The apparatus of claim 7, conformed for sweeping the steerable send beam of transmitted light, and conformed to perform said sweeping while concurrently detecting light from return signals in two or more additional input-side waveguides.

* * * * *